United States Patent
Leonard (10) Patent No.: US 8,196,151 B1
(45) Date of Patent: Jun. 5, 2012

(54) DETECTING QUEUE PROBLEMS USING MESSAGES ENTERING AND LEAVING A QUEUE DURING A TIME PERIOD

(75) Inventor: Mark Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1033 days.

(21) Appl. No.: 12/132,416

(22) Filed: Jun. 3, 2008

(51) Int. Cl.
*G06F 13/00* (2006.01)
*G06F 3/00* (2006.01)
*G06F 9/00* (2006.01)

(52) U.S. Cl. ..................................... 719/314

(58) Field of Classification Search .................. None
See application file for complete search history.

(56) References Cited

U.S. PATENT DOCUMENTS

| | | | |
|---|---|---|---|
| 2004/0215998 A1* | 10/2004 | Buxton et al. ............... | 714/2 |
| 2005/0089053 A1* | 4/2005 | Zhu ............................ | 370/412 |
| 2006/0146711 A1* | 7/2006 | Anbarani .................... | 370/235 |
| 2006/0212367 A1* | 9/2006 | Gross ......................... | 705/27 |

OTHER PUBLICATIONS

Duchovni, Victor, "Postfix Bottleneck Analysis", Dec. 25, 2006. 9 pages.*
Venema, Wietse, "QMGR(8)", Oct. 17, 2007. 6 pages .*
Duchovni, Victor, "QSHAPE(1)", Oct. 27, 2007. 2 pages.*

* cited by examiner

*Primary Examiner* — Andy Ho
*Assistant Examiner* — Paul M Kim (57) ABSTRACT

A method, system and a computer-readable media for automatically detecting that a malfunction affecting message withdrawal from a queue is present is described. In one embodiment, the malfunction is detected by evaluating the number of messages that enter and leave a queue during a period of time. For example, if the messages entering the queue do not equal the messages leaving the queue a malfunction may be present. In one embodiment, queue-performance indicator is calculated based on the number of messages leaving and entering the queue. If the queue-performance indicator is outside of the normal-operating range an alarm is generated and sent to a designated responder who can fix malfunctions associated with the queue.

11 Claims, 5 Drawing Sheets

DETECTING QUEUE PROBLEMS USING MESSAGES ENTERING AND LEAVING A QUEUE DURING A TIME PERIOD

SUMMARY

The present invention is defined by the claims below. Embodiments of the present invention provide for generating an alarm based on messages that enter and leave a queue during a period of time. Embodiments of the present invention have several practical applications in the technical arts including detecting malfunctions that impact queue performance. Specifically, one embodiment automatically generates an alarm when the messages leaving the queue divided by messages entering the queue is less than a threshold number.

In a first illustrative embodiment, one or more computer-readable media having computer-executable instructions embodied thereon for performing a method of automatically detecting a malfunction affecting withdrawal of messages from a queue is described. The method includes receiving an incoming value that indicates how much data has entered the queue during a period of time and receiving an outgoing value that indicates how much data has exited the queue during the period of time. The method also includes calculating a queue-performance indicator using the incoming value and the outgoing value. The method further includes determining that the malfunction affecting withdrawal of messages from the queue exists when the queue-performance indicator is outside of a normal-performance range and, in response to the determining, generating an alarm event that indicates one or more components associated with the queue are malfunctioning.

In another illustrative embodiment, one or more computer-readable media having computer-executable instructions embodied thereon for performing a method of automatically generating an alarm indicating that a malfunction affecting message withdrawal from a queue is present is described. The method includes receiving a queue-performance indicator based on an incoming value indicating how many messages have entered the queue during a period of time and an outgoing value indicating how many messages have exited the queue during the period of time. The method also includes comparing the queue-performance indicator with a normal-performance range and, if the queue-performance indicator is outside the normal-performance range, transmitting an alarm message indicting that the malfunction affecting message withdrawal from the queue is present.

In a third illustrative embodiment, one or more computer-readable media having computer-executable instructions embodied thereon for performing a method of automatically generating an alarm indicating that a malfunction affecting message withdrawal from a queue is present is described. The method includes receiving an incoming value indicating how many messages have entered the queue during a period of time and receiving an outgoing value indicating how many messages have exited the queue during the period of time. The method also includes generating a queue-performance indicator for the queue using the incoming value and the outgoing value. The method further includes storing the incoming value, the outgoing value, and the queue-performance indicator all in association with the queue in a data store. The method also includes determining whether the queue-performance indicator is outside of a normal-performance range and, if the queue-performance indicator is outside of the normal-performance range, generating an alarm indicating that the malfunction affecting message withdrawal from the queue is present.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The present invention will be better understood from the detailed description provided below and from the accompanying drawings of various embodiments of the invention, which describe, for example, generating an alarm based on the number of messages entering and leaving a queue during a period of time. The detailed description and drawings, however, should not be read to limit the invention to the specific embodiments. Rather, these specifics are provided for explanatory purposes that help the invention to be better understood.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As stated above, the present invention may be embodied as, among other things: a method, system, or computer-program product that is implemented as software, hardware or a combination of the two, or as computer-readable media having computer-usable instructions embodied thereon. In these embodiments, the exemplary operating environment may be as simple as a single computing device. Examples of computing devices that may be suitable for use with the invention include, but are not limited to, personal computers, server computers, handheld or laptop devices, multiprocessor systems, microprocessor-based systems, set top boxes, programmable consumer electronics, network personal computers (PCs), minicomputers, and mainframe computers.

Figure 1:
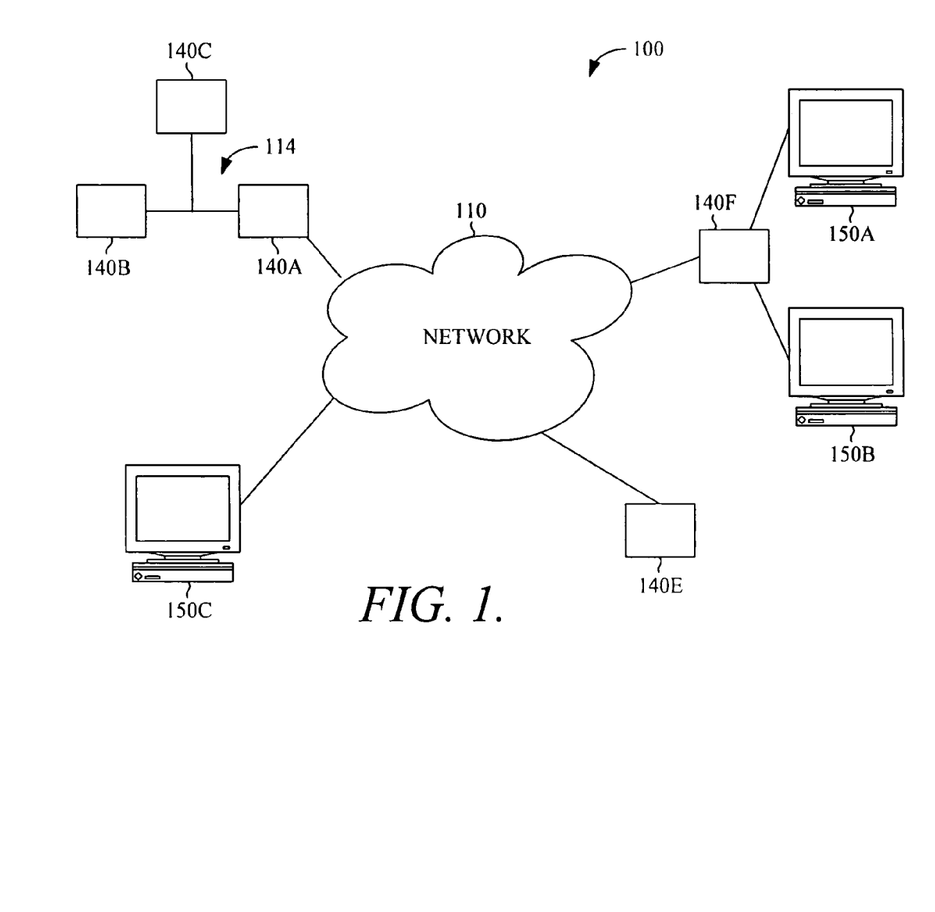
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C which communicate with each other via LAN 114, servers 140E and 140F all of which communicate with each other via network 110. Operating environment 100 is merely an example of one suitable networking environment and is not intended to suggest any limitation as to the scope of use or functionality of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
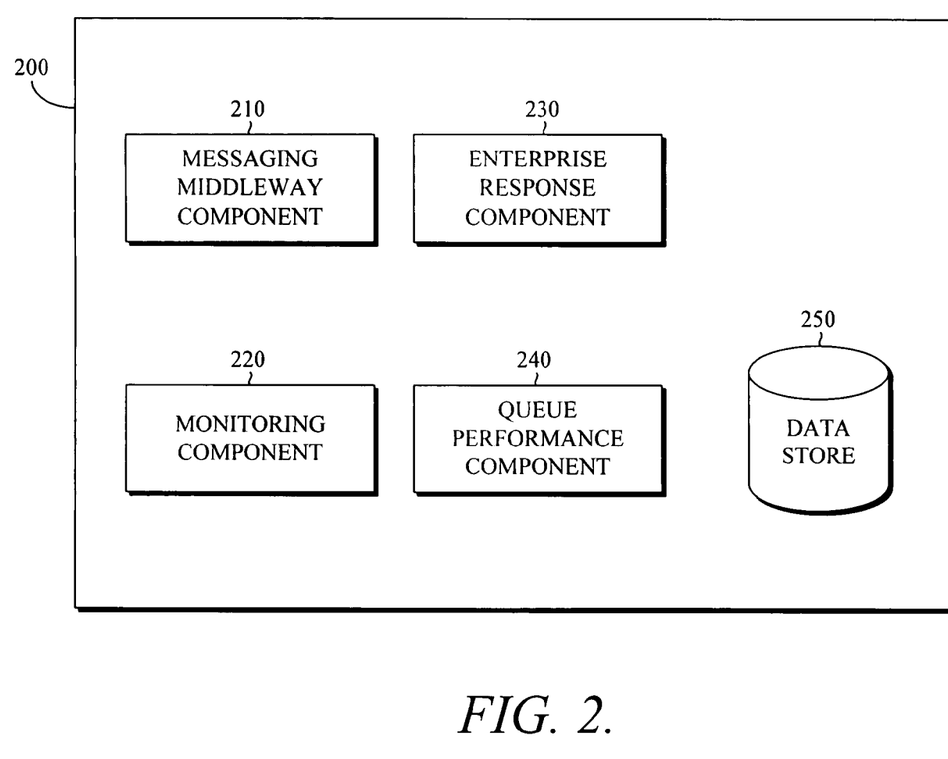
FIG. 2 is a drawing of an exemplary computing system architecture in which an embodiment of the present invention may be practiced.

Turning now to FIG. 2, a block diagram depicts an exemplary computing system architecture 200 suitable for automatically generating an alarm based on the number of messages entering and leaving a queue during a time period. It will be understood and appreciated by those of ordinary skill in the art that the exemplary computing system architecture 200 shown in FIG. 2 is merely an example and is not intended to suggest any limitation as to the scope of the use or functionality of the present invention. Neither should the exemplary computing system architecture 200 be interpreted as having any dependency or requirement related to any single component or combination of components illustrated therein.

Exemplary computing system architecture 200 includes a messaging-middleware component 210, a monitoring component 220, an enterprise response component 230, queue-performance component 240, and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a message-oriented middleware) include IBM's WebSphere® Mqueue (formerly Mqueue Series®), Fiorano's Mqueue, Oracle Advanced Queuing (AQ), and Microsoft's MSMqueue. The messaging-middleware component 210 can be any application that uses queues to transfer messages from one application to another. For example, information from application A is formed into one or more messages. These messages from application A are placed in a sending queue, within the messaging-middleware component 210, and transferred by the messaging-middleware component 210 into a receiving queue within the messaging-middleware component 210. Program B then retrieves the messages from the receiving queue. The messages are transmitted through channels within the messaging-middleware component. In this example, programs A and B could be located on any computing device communicatively coupled to the one or more computers on which the messaging-middleware component 210 resides. A messaging-middleware client may reside on the computing device on which programs A and B reside to allow interaction with the messaging-middleware component 210.

The sending and receiving queues within the messaging-middleware component 210 are described by a series of attributes. Each attribute has an associated value or setting. For example, one attribute could be a queue name and the associated setting could be "SprintBillinginfo1." Some attributes are preset, while other attributes measure current conditions within the queue and change over time. For example, the queue name attribute is pre-set, but the current queue depth attribute changes based on the number of messages in the queue. Throughout this disclosure preset attributes will be associated with settings, and attributes that are based on queue conditions are associated with attribute values. The primary attribute settings and values that are involved in embodiments of the present invention include an incoming value, an outgoing value, and a reset-time-interval setting. Many other attributes may be used to describe a queue and may be accessed or modified in embodiments of the present invention.

The above mentioned attributes and settings are related to the amount of information or data entering and leaving a queue. The amount of information entering or leaving a queue may be measured in a variety of units of measure including the number of messages or bytes of data. Throughout this description the amount of information will be described in terms of messages, but the invention is not intended to be limited to measuring the information entering and leaving a queue in terms of messages. A queue has a capacity to hold a limited amount of information, which may be referred to as the maximum queue depth. The maximum allowable depth setting is the maximum amount of information the queue can hold before incoming messages are turned away. The current depth value is the current amount of information in the queue.

The incoming value is the amount of messages that have entered the queue since a reset period. Once the time period is reset, the incoming value is reset to zero and increases with each message that enters the queue. The outgoing value is the amount of messages that have exited the queue since the reset period. The reset time interval value is the time period after which the incoming value and the outgoing value are reset. In one embodiment, the incoming value is called the enqueue rate and the outgoing value is called the dequeue rate.

Monitoring component 220 is configured to monitor messaging-middleware objects (e.g., channels and queues) to detect problems affecting the objects that may require corrective actions. A problem with a queue could indicate that a component associated with the queue is malfunctioning or the queue itself is malfunctioning. Examples of commercially available monitoring components include HP Openview®, queue Pasa!® by MQSoftware, Candle's PathWAI, and BMC Patrol. The monitoring component 220 may retrieve, store, and evaluate queue values periodically to ascertain whether a problem is present. For example, the current depth of the queue could be retrieved periodically. Having retrieved an attribute value, the attribute value is then evaluated against threshold values within the monitoring component 220, such as a high-depth threshold setting for a particular queue. The monitoring component 220 would then generate an alarm if the current queue depth exceeds the high-depth threshold value.

The monitoring component 220 is also configured to generate and transmit notifications describing problems associated with a queue. In one embodiment, the notification is transmitted to enterprise response component 230. In another embodiment, the monitoring component 220 directly notifies a designated responder about the alarm condition.

Enterprise response component 230 is configured to coordinate a response to malfunctions associated with a queue. The enterprise response component 230 may receive information regarding problems from the monitoring component 220 or another source. Upon receiving a notification, the enterprise response component 230 may page a designated responder to investigate the alarm condition. A designated responder may be an individual person or group of people given responsibility to fix malfunctions associated with assigned queues. In another embodiment, the designated responder may be a computer application that takes corrective actions.

The queue-performance component 240 is configured for calculating a queue-performance indicator. The queue-performance indicator is calculated based on the amount of messages entering the queue during a time period and the amount of messages leaving the queue during the same time period. In one embodiment, the queue-performance indicator is the outgoing value divided by the incoming value. In another embodiment, the queue-performance indicator is the incoming value minus the outgoing value. The queue-performance indicator indicates whether there is a problem with a component responsible for withdrawing data from the queue or with the queue itself. Under normal operating conditions, the amount of messages entering the queue should be roughly equal to the amount of messages leaving the queue. If this is not the case, a component associated with removing messages from the queue may be malfunctioning.

The data store 250 is configured for storing information related to a queue. Information such as the incoming value, the outgoing value, the current depth, and other queue attributes including queue identification information may be stored.

Figure 3:
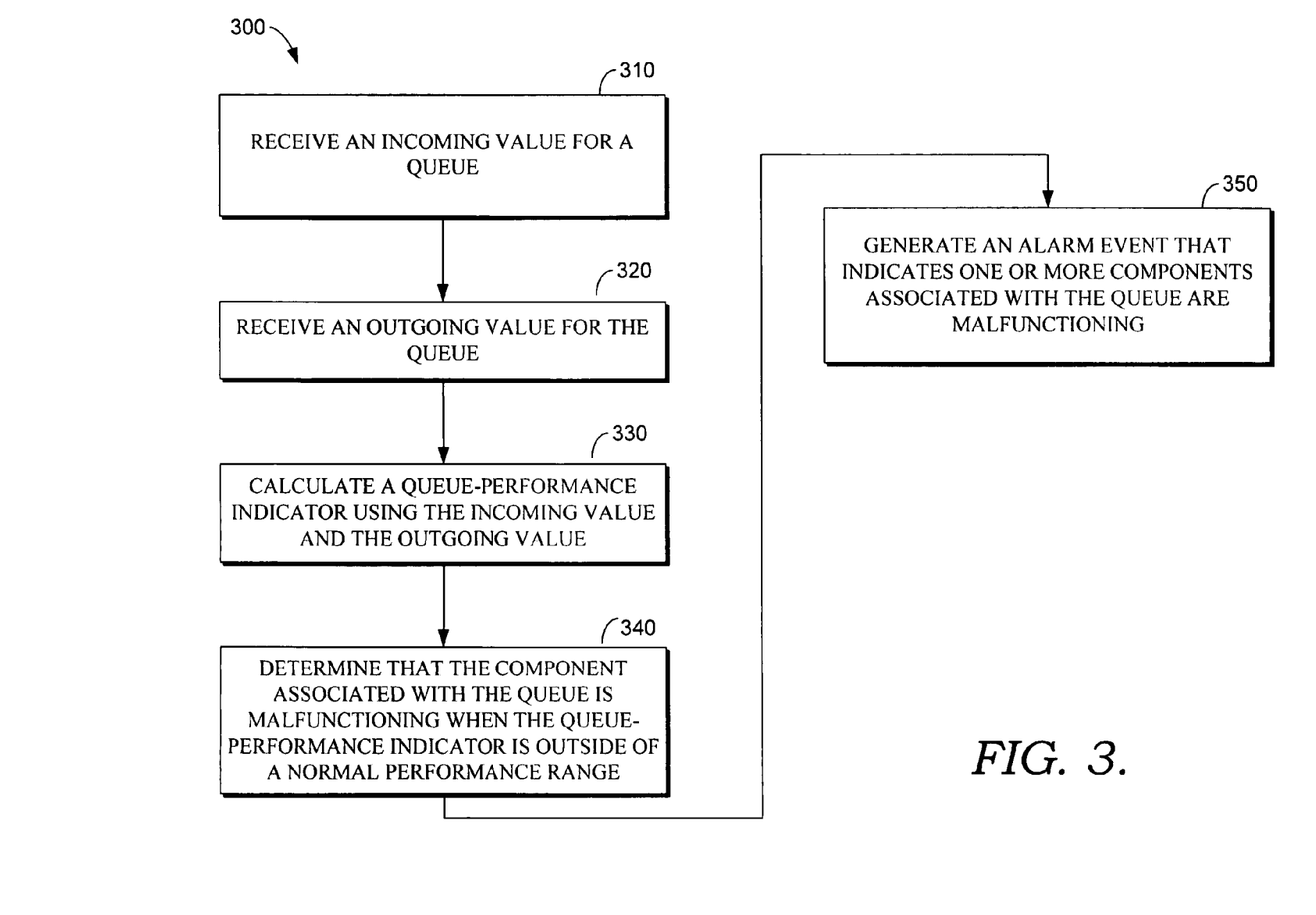
FIG. 3 is a flow diagram in which a method of automatically detecting a malfunction affecting withdrawal of messages from a queue is described according to an embodiment of the present invention.

Turning now to FIG. 3, a method of automatically detecting a malfunction affecting withdrawal of messages from a queue is described and designated generally as numeral 300. At Step 310, an incoming value that indicates how much data has entered the queue during a time period is received. As described previously, the data may be measured in bytes, number of messages, or other units of measure. The queue may be associated with a messaging-middleware application. In one embodiment, the queue is a receiving queue that receives data from an application using the messaging-middleware application to transmit data to a second application.

In one embodiment, the incoming value is an attribute value associated with the queue in the messaging-middleware application. The incoming value measures the data entering the queue during a time period. The incoming value is reset to zero at the conclusion of the time period. In one embodiment, the incoming value is retrieved by a monitoring component at the same time the incoming value is reset to zero. Other methods of retrieving an incoming value are also possible.

At Step 320, an outgoing value that indicates how much data has exited the queue during a time period is received. Like the incoming value, the outgoing value may be an attribute value associated with a messaging-middleware queue. The outgoing value may be reset to zero at the conclusion of the time period. In one embodiment, the outgoing value is retrieved by a monitoring component at the same time the outgoing value is reset to zero. The incoming value and the outgoing value are reset at the same time. Thus, the incoming value and outgoing value are associated with the same queue and are measured over the same period of time.

At Step 330, a queue-performance indicator is calculated using the incoming value and the outgoing value. The queue-performance indicator may be the outgoing value divided by the incoming value, if neither the incoming value nor the outgoing value is equal to zero. If the incoming value is equal to zero, then the queue-performance indicator may be set to a number indicating there is not a malfunction associated with the queue. If the outgoing value is equal to zero, then the queue-performance indicator may be set to zero or another number indicating that a malfunction affecting withdrawal of messages from the queue is present. Other methods of calculating the queue performance-indicator are possible. For example, the queue-performance indicator may be the incoming value minus the outgoing value.

At Step 340, a malfunction affecting the withdrawal of messages from the queue is determined to exist when the queue-performance indicator is outside of a normal-performance range. The normal-performance range is the range of operation in which a malfunction related to withdrawal of messages from the queue is not present. The normal-performance range associated with a queue may vary from queue to queue. For example, a queue may normally buffer messages for a long period of time. In such an instance, a significant gap between the messages entering and leaving the queue may be normal and not indicate a malfunction is present. In other instances, even a very small gap could indicate a component associated with the queue is malfunctioning. The normal-performance range is selected to account for the different queue conditions.

The units of measure associated with the normal performance are the same as those used for the queue-performance indicator. As described previously, the queue-performance range may be calculated as a quotient of the outgoing messages divided by incoming messages and or the difference between the outgoing and incoming messages. If the queue-performance indicator is the difference between the outgoing and incoming messages, then the normal operating range is the range between the incoming value equaling the outgoing value and the maximum difference between the incoming and outgoing messages that does not indicate a malfunction affecting the withdrawal of messages from the queue is present. If the queue-performance indicator is the quotient of the outgoing messages divided by incoming messages, then the normal operating range is between 1 (incoming value equals the outgoing value) and the minimum quotient that does not indicate a malfunction affecting the withdrawal of messages from the queue is present.

Different methods of calculating a queue-performance indicator are suited to queues having different message volume variations. Calculating the queue-performance indicator as the difference between the incoming value and outgoing value may not be well suited for queues with a variable volume of message traffic because it is difficult to determine a normal operating range that accurately reflects a malfunction in both a high-volume and low-volume situation. For example, if during part of the day the volume of messages entering and leaving the queue is quite small, then a small difference between the incoming and outgoing values could indicate a malfunction is present. However, the malfunction would not be detected by a normal operating range based on a large volume of traffic where the same small difference between the incoming and outgoing values might not indicate a malfunction is present. Thus the normal-performance range as measured by the difference between incoming and outgoing messages could change based on variations in traffic volume. If the normal-performance range was based on a small-traffic volume, then inaccurate (false positives) malfunction determinations could be made when the traffic volume is high. Conversely, if the normal-performance range is based on the high-traffic volume, actual malfunctions occurring during low-traffic volume could be missed. Thus, calculating the queue-performance indicator as the difference between the incoming value and outgoing value may not be desirable for queues that experience significant variations in message volume. However, using the difference between the incoming value and outgoing value may work well for queues with a steady volume of message traffic. Using a queue-performance indicator based on dividing the outgoing messages by the incoming messages may work well for queues with variable message volume. Ideally, close to 100% of the messages entering the queue leave the queue during a time period regardless of the present message volume.

At Step 350, an alarm event that indicates one or more components associated with the queue are malfunctioning is generated. The alarm event is in response to the determination made previously in Step 340. The alarm event may be sent to an enterprise response component that alerts a designated responder of the potential problem associated with the queue. A designated responder may be a person with responsibility for the queue or components associated with the queue. In one embodiment, the incoming value, the outgoing value, and the queue-performance indicator are stored for later retrieval in a data store. In one embodiment, the normal operating range is specified on a queue-by-queue basis by designated responders associated with the queue.

Figure 4:
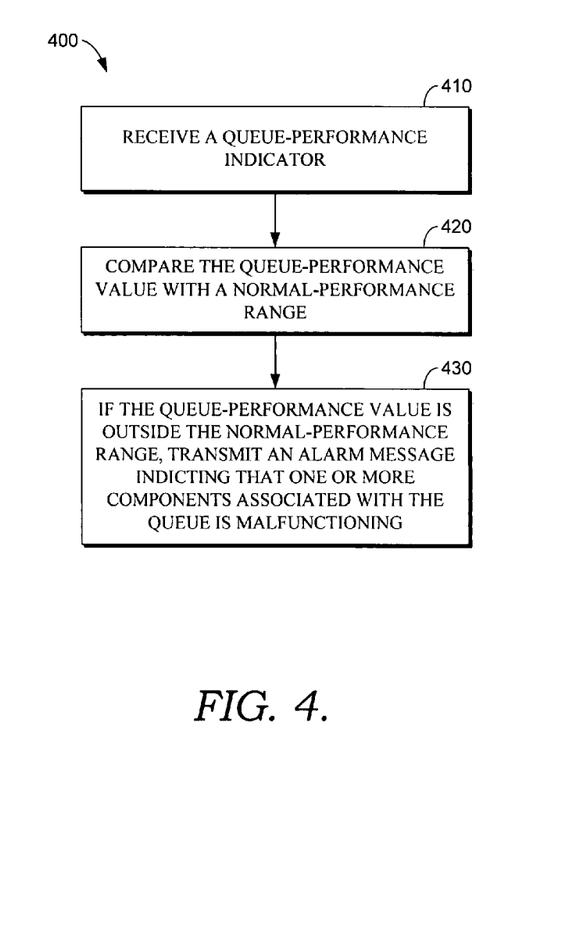
FIG. 4 is a flow diagram in which a method of automatically generating an alarm indicating that a malfunction affecting message withdrawal from a queue is present is described according to an embodiment of the present invention.

Turning now to FIG. 4, a method of automatically generating an alarm indicating a malfunction affecting message withdrawal from a queue is present is described and designated generally with numeral 400. At Step 410, a queue-performance indicator is received. As described previously, the queue-performance indicator is based on an incoming value that indicates how many messages have entered the queue during a period of time and an outgoing value that indicates how many messages have exited the queue during the period of time. The queue-performance indicator may be calculated by dividing the outgoing value by the incoming value or subtracting the outgoing value from the incoming value.

At Step 420, the queue-performance indicator is compared with a normal-performance range. As described previously, the normal-performance range could vary depending on how the queue-performance indicator is calculated and the specific queue.

At Step 430, if the queue-performance indicator is outside the normal-performance range, then an alarm message is transmitted that indicates a malfunction affecting message withdrawal from a queue is present. The malfunction may be with the queue or a component associated with the queue such as a sending or receiving application, a channel, or other component. As described previously, the alarm message may be sent directly to a designated responder, or sent to an additional component that in turn relays the alarm message to a designated responder.

Figure 5:
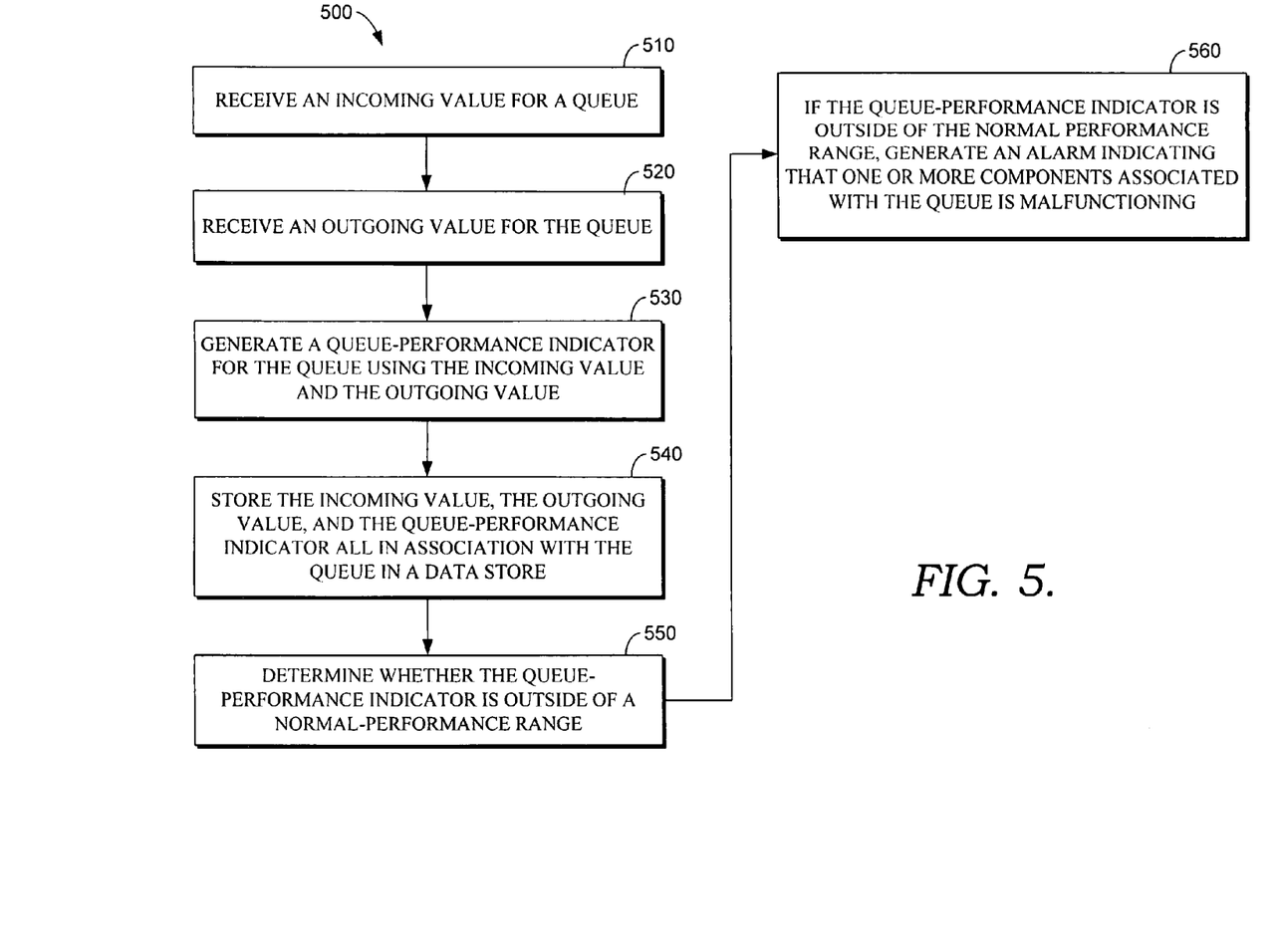
FIG. 5 is a flow diagram in which a method of automatically generating an alarm indicating that a malfunction affecting message withdrawal from a queue is present is described according to an embodiment of the present invention.

Turning now to FIG. 5, a method of automatically sending an alarm indicating a malfunction affecting message withdrawal from a queue is present is described and designated generally with numeral 500. At Step 510, an incoming value for a queue is received. As described previously, the incoming value indicates how many messages have entered the queue during a period of time. At Step 520, an outgoing value for the queue is received. As described previously, the outgoing value indicates how many messages have exited the queue during the period of time. At Step 530, a queue-performance indicator is generated using the incoming value and the outgoing value. As described previously, the queue-performance indicator may be calculated by dividing the incoming value by the outgoing value. In another embodiment, the queue-performance indicator is calculated by subtracting the incoming value from the outgoing value.

At Step 540, the incoming value, the outgoing value, and the queue-performance indicator are all stored in association with the queue in a data store. By storing the queue-performance indicator, a normal-performance range may be determined by evaluating the variations in the queue-performance indicator over time.

At Step 550, it is determined whether the queue-performance indicator is outside of a normal-performance range. As described previously, the normal-performance range may be expressed as a variety of forms depending on how the queue-performance indicator is calculated. At Step 560, if the queue-performance indicator is outside of the normal-performance range, then an alarm is generated that indicates that one or more components associated with the queue is malfunctioning. As described previously, the alarm may be sent to a designated responder directly, or to a second program or component that relays the alarm to the designated responder. The contents of the alarm may include queue identification information, a time when the alarm is generated, the queue-performance indicator, and the normal-performance range.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon that, when executed by a computing device, perform a method of automatically detecting a malfunction affecting withdrawal of messages from a queue, the method comprising:
   receiving an incoming value that indicates how much data has entered the queue during a period of time, wherein the queue is associated with a messaging-middleware application;
   receiving an outgoing value that indicates how much data has exited the queue during the period of time, wherein the period of time is an interval of time since the incoming value and outgoing value were set to zero;
   storing the incoming value and the outgoing value in a data store, wherein the incoming value and the outgoing value are stored in association with information that identifies the queue;
   calculating a queue-performance indicator using the incoming value and the outgoing value by dividing the outgoing value by the incoming value when neither the incoming value nor the outgoing value is zero;
   determining that the malfunction affecting withdrawal of messages from the queue exists when the queue-performance indicator is outside of a normal-performance range, wherein the queue-performance indicator is outside of the normal-performance range when the queue-performance indicator is less than a normal performance threshold value; and
   in response to said determining, generating an alarm event that indicates one or more components associated with the queue are malfunctioning.

2. The media of claim 1, further comprising transmitting the alarm event to an application that contacts a designated responder.

3. The media of claim 1, further comprising setting the queue-performance indicator to 1 if the incoming value is equal to zero or when the incoming value and the outgoing value are both zero.

4. The media of claim 1, further comprising setting the queue-performance indicator to zero when the outgoing value is zero.

5. One or more non-transitory computer-readable media having computer-executable instructions embodied thereon that, when executed by a computing device, perform a method of automatically generating an alarm indicating that a malfunction affecting message withdrawal from a queue is present, the method comprising:
   receiving a queue-performance indicator based on an incoming value indicating how many messages have entered the queue during a period of time and an outgoing value indicating how many messages have exited the queue during the period of time, wherein, when neither the outgoing value nor the incoming value is zero, the queue is associated with a messaging-middleware application, and wherein the queue-performance indicator is the outgoing value divided by the incoming value, and wherein the period of time is an interval of time since the incoming value and outgoing value were set to zero;
   receiving the incoming value and the outgoing value, wherein the incoming value and the outgoing value are generated by a messaging-middleware application;
   comparing the queue-performance indicator with a normal-performance range; and
   when the queue-performance indicator is outside the normal-performance range, transmitting an alarm message indicting that the malfunction affecting message withdrawal from the queue is present, wherein the queue-performance indicator is outside of the normal-performance range when the queue-performance indicator is below a threshold number.

6. The media of claim 5, wherein the alarm is transmitted to a component that contacts a designated responder who is responsible for components associated with the queue.

7. One or more non-transitory computer-readable media having computer-executable instructions embodied thereon that, when executed by a computing device, perform a method of automatically generating an alarm indicating that a malfunction affecting message withdrawal from a queue is present, the method comprising:
   receiving an incoming value indicating how many messages have entered the queue during a period of time, wherein the queue is associated with a messaging-middleware application, and wherein the period of time is an interval of time since the incoming value and outgoing value were set to zero;
   receiving an outgoing value indicating how many messages have exited the queue during the period of time;
   generating a queue-performance indicator for the queue using the incoming value and the outgoing value by dividing the outgoing value by the incoming value when neither the incoming value nor the outgoing value is zero;
   storing the incoming value, the outgoing value, and the queue-performance indicator all in association with the queue in a data store;
   determining whether the queue-performance indicator is outside of a normal-performance range, wherein the queue-performance indicator is outside of the normal-performance range when the queue-performance indicator is less than a normal performance threshold value; and
   when the queue-performance indicator is outside of the normal-performance range, generating the alarm indicating that the malfunction affecting message withdrawal from the queue is present.

8. The media of claim 7, further comprising transmitting the alarm to a designated responder.

9. The media of claim 7, wherein the method further comprises, when the incoming value is zero, setting the queue-performance indicator to a value within the normal-performance range.

10. The media of claim 9, wherein the method further comprises, when only the outgoing value is zero, setting the queue-performance indicator to the value within the normal-performance range.

11. The media of claim 7, wherein the period of time is greater than zero and less than five minutes.

* * * * *